(12) United States Patent
Shepherd et al.

(10) Patent No.: US 11,843,816 B2
(45) Date of Patent: Dec. 12, 2023

(54) APPARATUSES, SYSTEMS, AND METHODS FOR ADDING FUNCTIONALITIES TO A CIRCULAR BUTTON ON A REMOTE CONTROL DEVICE

(71) Applicant: Sling TV L.L.C., Englewood, CO (US)

(72) Inventors: Dale Lynn Shepherd, Lindon, UT (US); Andrew Lynn, American fork, UT (US); Curtis Delon Archibald, Mona, UT (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 17/457,958

(22) Filed: Dec. 7, 2021

(65) Prior Publication Data
US 2023/0179821 A1    Jun. 8, 2023

(51) Int. Cl.
*H04N 21/422* (2011.01)
*H04N 21/472* (2011.01)

(52) U.S. Cl.
CPC ... *H04N 21/4221* (2013.01); *H04N 21/42212* (2013.01); *H04N 21/42224* (2013.01); *H04N 21/47217* (2013.01)

(58) Field of Classification Search
CPC ......... H04N 21/4221; H04N 21/42212; H04N 21/42224; H04N 21/47217
USPC .......................................................... 386/343
See application file for complete search history.

(56) References Cited

U.S. PATENT DOCUMENTS

| 7,937,662 | B2 * | 5/2011 | Tsai | G11B 27/34 |
| | | | | 715/719 |
| 9,965,173 | B2 * | 5/2018 | Warner | G06F 3/04845 |
| 11,099,806 | B2 * | 8/2021 | Bromand | H04N 21/422 |
| 11,237,716 | B2 * | 2/2022 | Shepherd | G06F 3/03547 |
| 2009/0049407 | A1 * | 2/2009 | Casto | G06F 16/4387 |
| | | | | 715/828 |
| 2009/0066648 | A1 * | 3/2009 | Kerr | G06F 3/0485 |
| | | | | 345/158 |
| 2009/0109069 | A1 * | 4/2009 | Takasaki | G06F 3/018 |
| | | | | 341/35 |
| 2012/0314140 | A1 * | 12/2012 | Wiser | H04N 21/2668 |
| | | | | 725/13 |
| 2016/0249006 | A1 * | 8/2016 | Park | H04N 21/42204 |

OTHER PUBLICATIONS

Serway et al. Physics for Scientist and Engineers , 2000, Saunders College Publishing, vol. 1, pp. 292-298. (Year: 2000).*

* cited by examiner

*Primary Examiner* — Helen Shibru
(74) *Attorney, Agent, or Firm* — KW Law, LLP (57) ABSTRACT

Apparatuses, Methods, and Systems to enable the display of media content, the apparatus includes a remote control device; a keypad with a plurality of buttons for controlling a media player device; a circular button of the plurality of buttons that is configured to rotate in a clockwise direction and a counterclockwise direction; and in response to detected rotational motion either in the clockwise direction or the counterclockwise direction, the media player device is configured to cause an adjustable amount of forwarding or a reverse play operation in a position of playing streamed media content on a display device; wherein the adjustable amount of forwarding or reverse play operation of streamed media content corresponds to rotational motion detected of the circular button during the playing of the streamed media content.

20 Claims, 6 Drawing Sheets

APPARATUSES, SYSTEMS, AND METHODS FOR ADDING FUNCTIONALITIES TO A CIRCULAR BUTTON ON A REMOTE CONTROL DEVICE

TECHNICAL FIELD

This document generally relates to the use of control buttons on a remote controller and more particularly to adding functionalities to a circular control button configured on a remote control device that is ordinarily dedicated to controlling cursor movement by intercepting data generation by a rotational action for enhanced functions including control of playing operation of streaming media by a media player device.

BACKGROUND

An online media distribution service, such as the service currently available at www.sling.com, distributes content that is obtained from one or more sources to viewers over the Internet or a similar network. Distributed content may include television content, movies, other audio/visual content, audio content, and/or the like. Typically, viewers can connect to the online distribution service using a conventional web browser or another client to obtain streaming or file-based content as desired. Because users of such services typically demand a large variety of content, such distribution services often receive their distributed content from any number of different production sources, syndicators, web-based services, and/or other media sources as appropriate.

A variety of remote control devices are available to navigate on-screen user interfaces of media files from content sources for online media distribution services such as www.sling.com. Attempts have been made to configure these remote control devices with a reduced number of buttons while still enabling operational functionalities such as navigating through content in an on-screen user interface or controlling the streaming media from a media distribution service. In general, these remote control devices use a reduced button set and voice commands via natural language processing functions for navigating the user interface.

As a result, it is desirable to enhance control operation of a circular button found on a remote control device by adding functionalities to rotational data generation by rotational actions of the circular control button that are limited or ordinarily dedicated to controlling only cursor movement on a display, to expand the capabilities of control available by the circular button to include forward and reverse control of viewing options of played recorded media that is streamed by a media player.

It is desirable to convert rotational data generated by a remote control device's circular button with additional control features without any additional modifications to the hardware or the remote control device to enable at least the adjustable control of a linear position in viewed streamed media content in accordance with a manner and amount of rotation of the circular button whilst the streamed media is played on a display device.

These and other desirable features and characteristics will become apparent from the subsequent detailed description and the appended claims, taken in conjunction with the accompanying drawings and this background section.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

BRIEF SUMMARY

Apparatuses, methods, and systems for a remote control device for navigating an on-screen user interface and controlling the playing of streaming media content using a circular button or touchpad whilst playing streaming media content.

In one embodiment, an apparatus to enable the display of media content is provided. The apparatus includes a remote control device; a keypad with a plurality of buttons for controlling a media player device; a circular button of the plurality of buttons that are configured to rotate in a clockwise direction and a counterclockwise direction; and in response to detected rotational motion either in the clockwise direction or the counterclockwise direction, the media player device is configured to cause an adjustable amount of forwarding or a reverse play operation in a position of playing streamed media content on a display device; wherein the adjustable amount of forwarding or reverse play operation of streamed media content corresponds to rotational motion detected of the circular button during the playing of the streamed media content.

In at least one exemplary embodiment, the apparatus includes wherein the rotational motion of the circular button is converted via a script based on a linear function that represents a corresponding change in a timeline of the streamed media content by a control operation of a fast forward or reverse play from a current position on the timeline of the streamed media content played by the media player device.

In at least one exemplary embodiment, the apparatus includes wherein the rotational motion of the circular button is converted by the script based on a slope calculation that determines a velocity of movement of the circular button derived from differences in slope from positional data in a cartesian plane that is generated by the rotational movement of the circular button.

In at least one exemplary embodiment, the apparatus includes wherein the rotational motion of the circular button is converted to a linear change in position from a current position on a timeline of playing streamed media content in accordance with a calculated amount of the rotation movement.

In at least one exemplary embodiment, the apparatus includes wherein the rotation motion of the circular button is converted via the script in a forward or reverse linear position change of the played streamed media content.

In at least one exemplary embodiment, the apparatus includes wherein the remote control device is configured with a touchpad instead of the circular button, and the rotational movement is detected by gestures or swipes on the touchpad.

In at least one exemplary embodiment, the apparatus includes wherein the rotational movement is detected anywhere on the touchpad of the remote control device and includes either a gesture or swipe action.

In yet another exemplary embodiment, a method for controlling the display of media content is provided. The method includes configuring a remote control device with a button pad with a plurality of buttons for controlling a media player device wherein the plurality of buttons includes a circular button; configuring the circular button as a physical ring that is moveable in a clockwise and counterclockwise direction and is capable of generating at least coordinate data; intercepting, by a processor in communication with the remote control device, the coordinate data provided by the clockwise and counterclockwise rotational movement of the circular button using a script to convert the coordinate data to a linear data amount; and changing a current position of streamed media content of the media player device by the linear data amount.

In at least one exemplary embodiment, the method includes causing by the media player device a change defined by the linear data amount based on a linear function that represents a corresponding change in a timeline of the streamed media content by a control operation of a forward play or a reverse play that is responsive to the clockwise or counterclockwise movement of the circular button.

In at least one exemplary embodiment, the apparatus includes converting, by the processor, rotational motion of the circular button by the script based on slope calculation that determines a velocity of movement of the circular button derived from differences in slope based on the positional data in a cartesian plane generated by the rotational movement of the circular button.

In at least one exemplary embodiment, the method includes replacing the circular button of the remote control device with a touchpad wherein the rotational movement is detected by gestures or swipes on the touchpad.

In at least one exemplary embodiment, the method includes detecting the rotational movement anywhere on the touchpad of the remote control device.

In at least one exemplary embodiment, the method includes converting the rotational motion of gestures or swipes on the touchpad by the script based on a slope calculation that determines a velocity of movement of the circular button derived from differences in slope based on the positional data in the cartesian plane generated by the rotational movement on the touchpad.

In at least one exemplary embodiment, the method includes converting the rotational motion of gestures or swipes on the touchpad by the script based on slope calculation derived from positional data in the cartesian plane generated by the rotational movement on the touchpad.

In another exemplary embodiment, a video presentation system is provided. The system includes a receiver to receive data associated with streaming media content; a display operatively coupled to the receiver for presenting the streaming media content; and a remote control operatively coupled to the receiver with a circular button that performs more than one type of action or actions associated with controlling the display of the streaming media content; wherein coordinate data generated by a rotational movement of the circular button is intercepted and converted to linear data to initiate a forward play or a reverse play action of the streaming media content.

In at least one exemplary embodiment, the system includes wherein the circular button is ordinarily designated for cursor positioning on the display and is reconfigured to control play operation of the streaming media content.

In at least one exemplary embodiment, the system includes wherein the circular button is ordinarily designated for cursor positioning on the display and is reconfigured for use to navigate a user interface that includes items for selection.

In at least one exemplary embodiment, the system includes wherein the rotational motion of the circular button is converted by the script based on a slope calculation that determines a velocity of movement of the circular button derived from differences in slope based on positional data in a cartesian plane that is generated by the rotational movement of the circular button.

In at least one exemplary embodiment, the system includes wherein the remote control device is configured with a touchpad instead of the circular button, and the rotational movement is detected by gestures or swipes on the touchpad.

In at least one exemplary embodiment, the system includes wherein the rotational movement is detected anywhere on the touchpad of the remote control device and includes either a gesture or swipe action.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

References are made throughout this disclosure to the circular button (or touchpad) of a remote control device that can be used for navigation of a user interface and for controlling the streaming of media content. It is contemplated that the circular button may be a physical multi-function button or a virtual multi-function button that is capable of generating rotation data for conversion to linear movement to change a current viewing position whilst playing a streaming media content from a media player device when a streaming media content is displayed and for performing navigation operations when navigating a user interface by the user. That is, when content is being streamed, the circular button ordinarily defined to perform actions associated with cursor position can be configured for use with streaming media content and for navigating an on-screen application and selection of items on the on-screen application.

Figure 1:
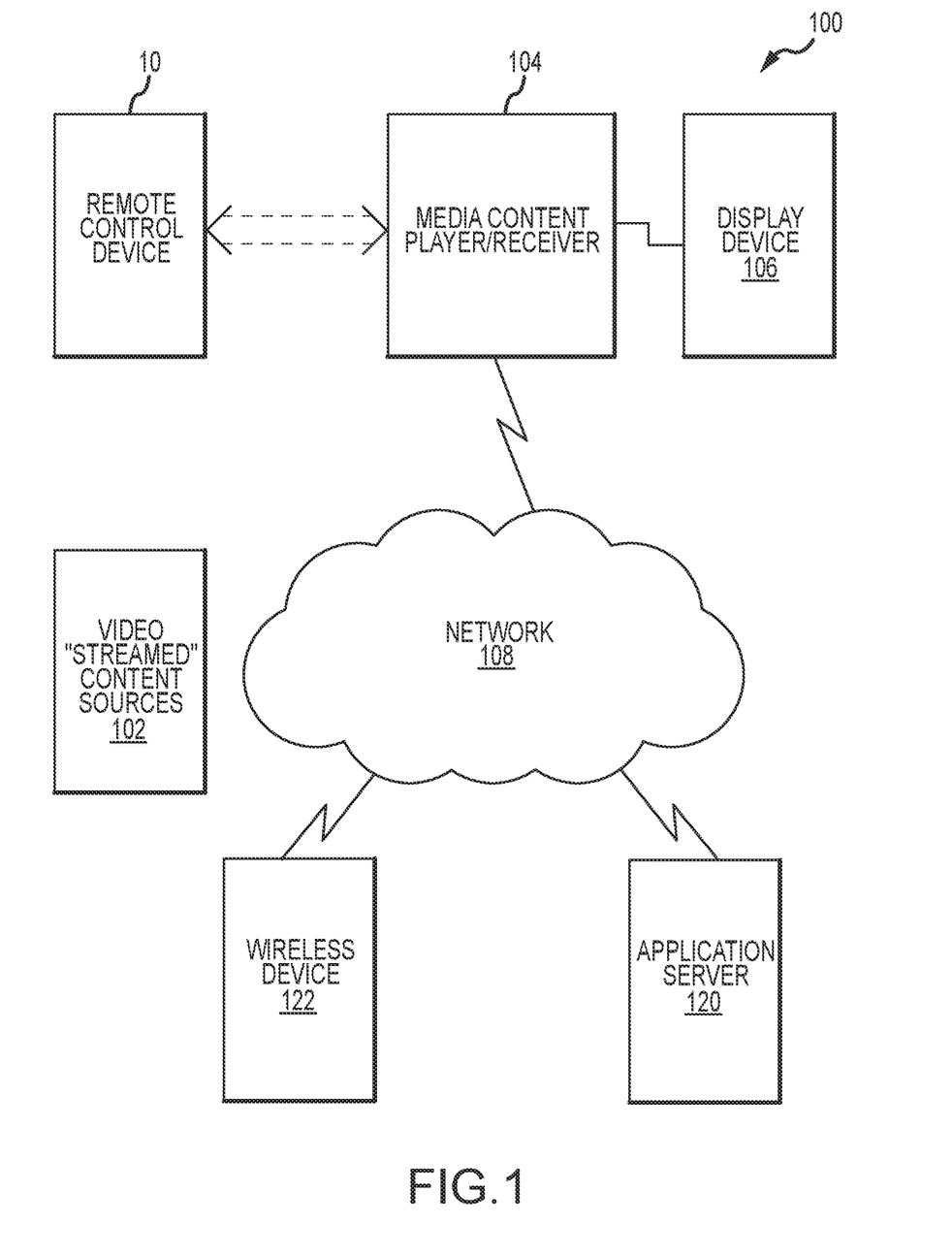
FIG. 1 is an exemplary diagram of the remote control device system in accordance with an embodiment.

FIG. 1 shows an exemplary remote control system 100 that could be used to control media content from any number of sources. "Media content" refers to any audio, video, audio/visual, or other programming in any streaming, file-based, or other formats. In various embodiment, the remote control device 10 navigates an on-screen user interface of a display device 106 which include items displayed of television, movie and/or other audiovisual works in any digital format such as MPEG, Windows Media, Quicktime, Real Media, H.264 and/or the like. Such content may be provided to any number of viewers using any sort of media player 104 which may include a receiver and is controlled by the remote control device 10. In various embodiments, the media playback devices could include desktop or notebook computers, mobile telephones, personal digital assistants, video game players, portable media players, and/or any other devices capable of receiving media content via a network and rendering audio and/or visual content to a viewer.

Network 108 is any digital or other communications network capable of transmitting messages between senders (e.g., host server 120) and receivers (e.g., client devices 122). In various embodiments, network 108 includes any number of public or private data connections, links, or networks supporting any number of communications protocols. Network 108 may include the Internet, for example, or any other network-based upon TCP/IP or other conventional protocols. In various embodiments, network 108 may also incorporate a wireless and/or wired telephone network, such as a cellular communications network for communicating with mobile phones, personal digital assistants, and/or the like. Various embodiments of network 108 may also incorporate any sort of wireless or wired local area networks, such as one or more IEEE 802.3 and/or IEEE 802.11 networks.

The host server 120 is any server or collection of servers capable of providing a front-end or other portal to system 100 that allows viewers to access media content. In various embodiments, host server 120 is a conventional web-type server that provides data to conventional web browsers or other client applications. Such data may be provided over network 108 using conventional TCP/IP, HTTP, and/or other protocols as desired. Generally, host server 120 will be implemented across any number of physical and logical hosts. For example, metadata and other visual content may be provided via a typical web portal residing at a well-known URL or other address, whereas streamed or other distributed content may be delivered from a separate host associated with a content delivery network or other providers. Conventional web hosting and development techniques may be applied to create a network host in any manner.

The media content may be received, formatted, and made available on host server 120 in any manner. In various embodiments, content is received from any number of different content of sources 102 at a receiving server. Content of sources 102 may include studios or other content creators, syndicators or other content distributors, television networks, production houses, web or other network-based distributors, and/or any number of other content of sources 102 as desired. Content may be delivered across any medium, including any sort of point-to-point or networked link. In various embodiments, the Internet or a similar network 108 may be used to receive content from one or more content of sources 102 as well as to distribute processed content to viewers. Providing content from multiple sources, however, can create a number of challenges. Often, each content source has its own preferred format for transporting new material. Media files may be delivered, for example, in any number of different manners (e.g., RSS, pushed or pulled FTP/TFTP, HTTP, and/or the like). Moreover, files may be received in any number of different compressed and/or uncompressed formats that need to be transcoded or otherwise converted before the content is available for distribution to viewers. Further, as viewers use an increasing variety of client devices (e.g., mobile phones, video game players, and other portable devices), it may be desirable to encode/transcode received content into any number of different distribution formats (e.g., formats of different sizes, bit rates, frame rates, resolutions and/or other parameters) to accommodate a variety of viewers and viewing devices. Hence, the types and amounts of transcoding or other processing that may be needed before distributing the received content can be significant.

Moreover, many different content providers have unique formats for the metadata that describes the media content. Most websites provide at least some description of the content that is distributed: this description may include the name of the program, names of actors/actresses, a brief description of the programming, any ratings or parental control information, or any other information as desired. This "metadata" information about the programming content may be provided by the content provider with the media content itself, or it may be retrieved from any other source as desired. In either case, formatting of the metadata can be a significant challenge due to the wide variety of formats that may be used by any number of different data sources.

Although FIG. 1 shows content being received at a host server 120, in practice content may be provided directly from sources 102 to media player 104. The host server 120, when present, suitably receives content from one or more sources 102 and provides the received content to a processing system (not shown) to the media (content) player 104. In embodiments that do provide a receiving host server 120, this server may be any conventional computing system capable of manually and/or automatically receiving content via any sort of pushed or pulled FTP/TFTP session, RSS, or other automated syndication, and/or any other techniques.

Metadata about the received content may be obtained from any source. In various embodiments, metadata is obtained from the content of sources 102 with the delivered content itself. In other instances, metadata may be obtained from any sort of database connected to network 108. The databases may be a web-based or other networked source of information (e.g., a database that can support queries across the network). Alternately, the database may be a local database that is not available on network 108.

In some embodiments, host server 120 suitably obtains the content and/or metadata using any relevant transport mode, and then performs a transformer process on the received content to place the received content (and its associated metadata, if appropriate) into a known format, as described more fully below. For example, the transformed content may be formatted as a media bus request (MBR) that is wrapped in an appropriate decorator or other structure for subsequent processing via network 108. Again, in some embodiments, the host server 120 may be partially or wholly eliminated, and content providers of sources 102 could simply provide some or all of their content in the preferred format directly to media player 104 for subsequent processing. Content providers could format MBR or other structures with appropriate decorators, for example. Content could alternately be delivered in any proprietary, open, or other agreed-upon formats to reduce the need for pre-processing by host server 120, as desired.

Received content may be processed using any sort of processing system. Various embodiments may be implemented using dedicated or shared hardware servers; other implementations may make use of virtual server features as part of a "cloud computing" service, such as any of the cloud computing services provided by AMAZON®, GOOGLE®, MICROSOFT®, IBM®, UBUNTU®, SUN MICROSYSTEMS® and/or any number of other providers. The AMA- ZON® Web Services (AWS) products and services available from AMAZON®, for example, could be used to implement some or all of the processing system in some embodiments, although other embodiments may use any other products or services as desired.

Content and metadata are therefore received from any number of sources as desired. Received content is processed to properly format or otherwise prepare the content for distribution from host server 120 on network 108 to any number of client devices 122.

Continuing with FIG. 1, the remote control device 10 may be used to provide a convenient way to navigate a user interface on-screen which displays the media content from the media content service provider. In an exemplary embodiment, the remote control device 10 may be configured with a set of buttons that includes a circular button that allows linear movement from a current position of a displayed media content that is streamed by a media player device. In another exemplary embodiment, the remote control device 10 may include a circular button configured for directional movement to navigate through a user interface. In another exemplary embodiment, the remote control device 10 may include a single bi-directional button configured as a circular button 20 (shown in FIG. 2) or via a touchpad that detects user touch of rotational motion to control the movement and position of playing streamed media content and to navigate through the user interface.

In exemplary embodiments, the remote control device 10 may configured as an electronic watch type device configured with touch screen that is capable of receiving data generated by touch operations. For example, the touch screen of the electronic watch type device would allow detecting user touch of rotational motion to the control the movement and position of playing stream content and to navigate through the user interface of a display device in communication with the electronic watch type device. As an example, the APPLE® watch with touch screen may be used to detect user touch actions of rotational motion. Also, assistive touch applications of the APPLE® watch may be implemented with rotational motion detections on the touch screen to control the movement and position of playing content.

The remote control device 10 may be also used for a variety of operations associated with streaming media content. In an exemplary embodiment, the remote control device 10 may allow for functions such as play, reverse, forwarding, stop, pause, fast-forwarding, fast reverse, etc. of the streaming media content. In an exemplary embodiment, the remote control device 10 may separate a single larger circular button (or configure a touchpad region) for control of the streaming media content operations and navigate the user interface from other operational buttons such as for pulling up a menu or actuation of voice recognition functions, as the single larger circular button can allow for easier access and ergonomic manipulation of rotating in either a clockwise or counterclockwise direction.

Figure 2:
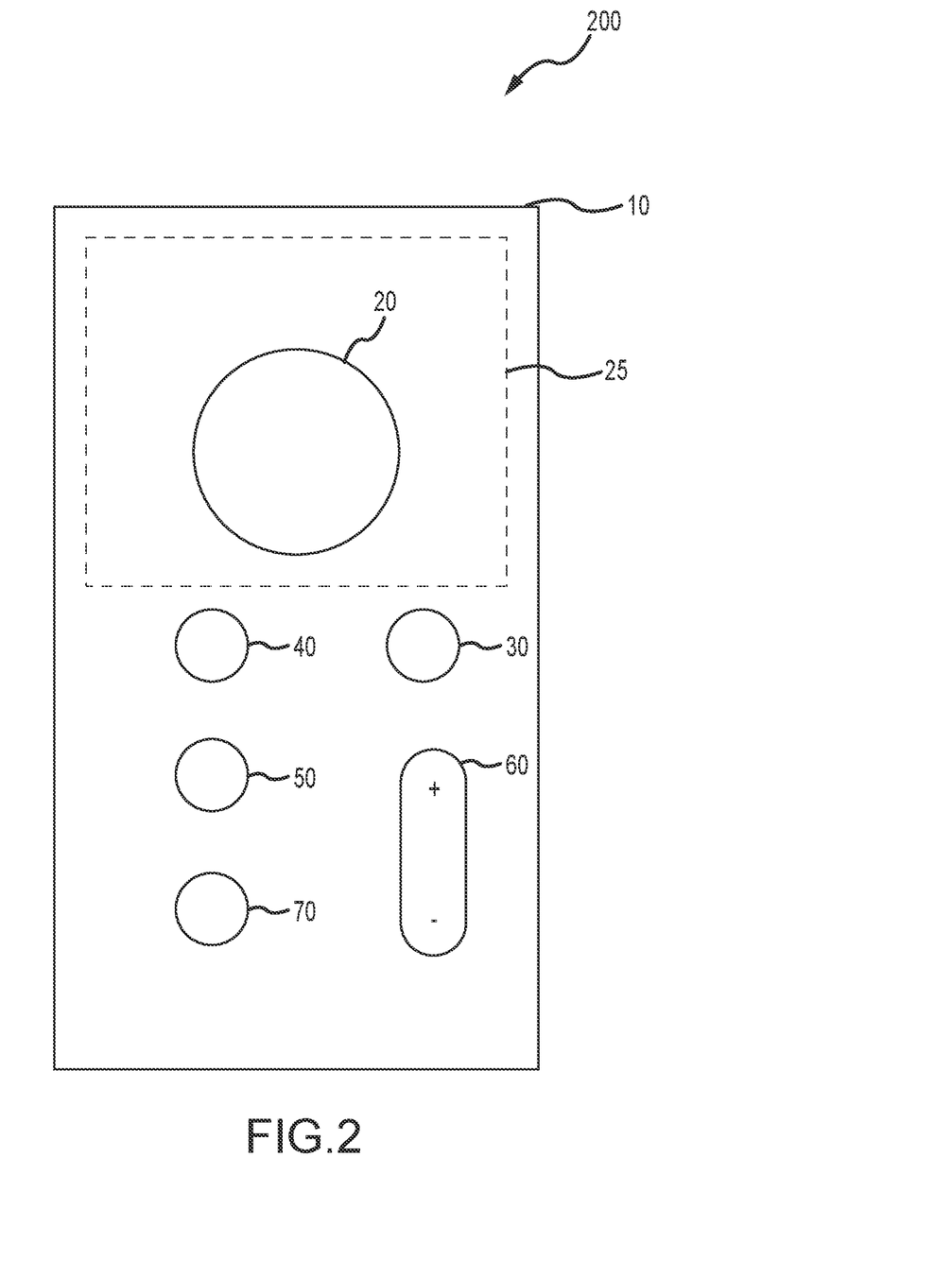
FIG. 2 is an exemplary diagram of the remote control device with a circular button or touchpad in accordance with an embodiment.

FIG. 2 is an exemplary diagram of a remote control system 200 (in reference to the remote control device 10 of FIG. 1) where various configurations of the buttons are used for playing media content and for navigating the user interface are illustrated. In addition, an additional button (optional) may be added for actuating a voice recognition service for enabling speech capture of voice commands for navigating the user interface and controlling the streaming media operations.

In FIG. 2 there is shown a configuration of the remote control system 200 of a set of buttons for controlling the streaming of video content that is played and for navigating a user interface. The remote control device 10 can include a variety of button configurations that may include a circular button 20 which is a physical rotation button that allows rotation in either the clockwise or counterclockwise direction. When a user rotates the circular button in either direction, data is generated that corresponds to the amount of rotation, and the manner that the rotation is conducted. For example, the rotation of the circular button 20 may be performed aggressively or fast, or incrementally or slow. In other embodiments, the remote control device 10 can be configured without a physical circular (ring) button 20 but instead, implement a capacitive touchpad 25 that is capable of detecting electrical impulses from a user's touch that can be translated to rotational gestures or other gestures, and generate the appropriate detected data of the user's movements for interception by the script and for sending to a receiver device (not shown) to control the media player.

In an exemplary embodiment, as an example, the circular button movement enhancements can be applied to a general-purpose touchpad or touch screen where the user could configure circular-like gestures with manual (finger) movements in a circular motion mimicking rotations of the circular button 20.

In an exemplary embodiment, a rotation of the circular button 20, or a gesture, swipe, or rotational type movement of a rotation on a (capacitive) touchpad 25 can generate rotational data (by physical rotation of a dial of the circular button 20 or electrical impulses on the touchpad 25) that are subsequently converted or translated by applications or scripts (i.e., downloaded) by a receiver device (or installed in memory of the remote control device 10 itself) that is capable of receiving communications from the remote control device 200 to control a media player currently displaying streamed media content. For example, a user may rotate the circular button 20 in either the clockwise or counter-clockwise direction and this, in turn, would cause rotation data to be generated by the remote control device 200. The rotational data is intercepted by the script or application by the manual movement of the rotation of the circular button 20. That is, ordinarily, the circular button 20 is configured to generate only (X, Y) cartesian positional data for the placement of a cursor on a display. The script converts the cartesian (X, Y) coordinate data into velocity vectors or into an angular movement to recognize rotation (i.e., estimate an amount of rotation) of the circular button 20 or rotational gestures on the touchpad 25.

In embodiments, filtering operations are employed to smooth raw positional data (i.e., the X, Y cartesian positional data of the cursor position) generated by the uneven movement of the user operations of the circular button 20 or erratic/jerky rotational gestures on the touchpad 25 to enhance calculations of the velocity vectors and angular movement that enables the subsequent recognition rotation amounts used in media operation control.

In embodiments, calculations based on a set of non-linear equations convert the position data or velocity vectors to linear movement of the cursor (or other control icons) on the display device (i.e., on a video screen or like). In embodiments, mathematical transforms are used to distinguish circular movements of the circular button 20 and other user actions such as swipes or gestures on the touchpad 25.

Additionally, the remote control device 10 includes a variety of other buttons that may include a home button 30, a menu button 40, a voice actuation button 50, a volume up/down toggle button 60, and a play/pause button 70 of streamed media content. In exemplary embodiments, the circular button 20 is a multi-directional button that generates positional data that is converted to rotational data to allow for more operations by a user by determining changes in a cartesian (X, Y) plane that correspond to angular amounts of rotation to control a forward and reverse play operation of streamed media content. In exemplary embodiments, the amount of forward and reverse play operations that are instructed to the media player device are determined by a linear transform of rotational motion calculations and may initiate actions dependent on amounts of calculated linear change that include a range of forwarding play to fast forward play or movement, and in the opposite direction of reverse play to fast reverse play or movement of the streamed media content.

In embodiments, for the calculations of rotational motion using linear transforms, in the case of large variations of user movement, a non-linear function is used to transform the large variation of movements (i.e., normalize to a linear scale) to the linear scale of the media (i.e., on-screen streamed video or like timeline) timeline. In addition, the calculations of rotational motion when the user makes small type movements are based on a linear transformation. That is, the linear transform function based calculations are better suited and/or required to account for slower and finer adjustments to the circular button 20 and like swipes or gestures by the user, and for incremental movements or control operations along the media timeline (while a non-linear transform function is used for calculations of fast user motions). The linear transform-based calculations also enable media control operations such as a quick scan of media content displayed in short or long videos or recorded streamed content. For example, user very fast and longer type movements of the circular button 20 and like swipes or gestures are enabled by using linear based functions in calculations of control operations that allow the user to navigate (i.e., move) the entire length of a video (or another type of recorded streamed content) whether the video displayed is short or long.

In an alternate exemplary embodiment, the circular button 20 may also be configured to enable a user faster navigation in a forward path or reverse path direction while navigating an on-screen user interface. The circular (i.e., multi-directional button) button 20 may be configured by translated positional coordinate data that is generated in accordance with rotational motion with a tab selection for navigating in an up, down, right, and left direction on a user interface. For example, if the user desired to select an item in the right direction from the present position of the on-screen select feature (not shown), the user may simply actuate or press a corresponding directional tab of the tabs of the circular (multi-directional) button 20 to instruct the on-screen select feature to move one item at a time to the desired item. That is, each user action on the multi-directional button would enable a one-item movement of the select feature. If the user after initializing a direction, then by rotation of the circular button 20 (i.e., the translate positional data) could enable the user to then navigate a set of items (i.e., pass via translated linear-direction based on a rotation amount) on the user interface rather than to proceed one item at a time in a consecutive manner until the item that the user desires is selected. The circular button 20 is therefore configured via a script to enable the user to navigate multiple items in one rotational motion in either a forward or backward direction within a select screen area. For example, this may be a set of items in a sub-category area or a set of items in a category area. The circular button 20 by rotation does not cross categories to sub-categories in a user interface unless the user navigates up or down the separate areas. In an exemplary example, the user may direct the select feature from a category area to a subcategory area or vice versa to navigate between both areas and select items in each area by the rotation of the circular button 20 or to navigate or scroll past a series of items in either direction.

In various exemplary embodiments, the user may cause the media player to fast forward or fast reverse play of the media content by the fast rotation of the circular button 20 in either direction. Also, the circular button 20 is configured to work in conjunction with the other buttons including the play/pause button 70.

In another exemplary embodiment, the circular button 20 may by the rotational motional that has been translated allow for surfing across or scrolling down multiple categories of an online EPG displayed.

Figure 3:
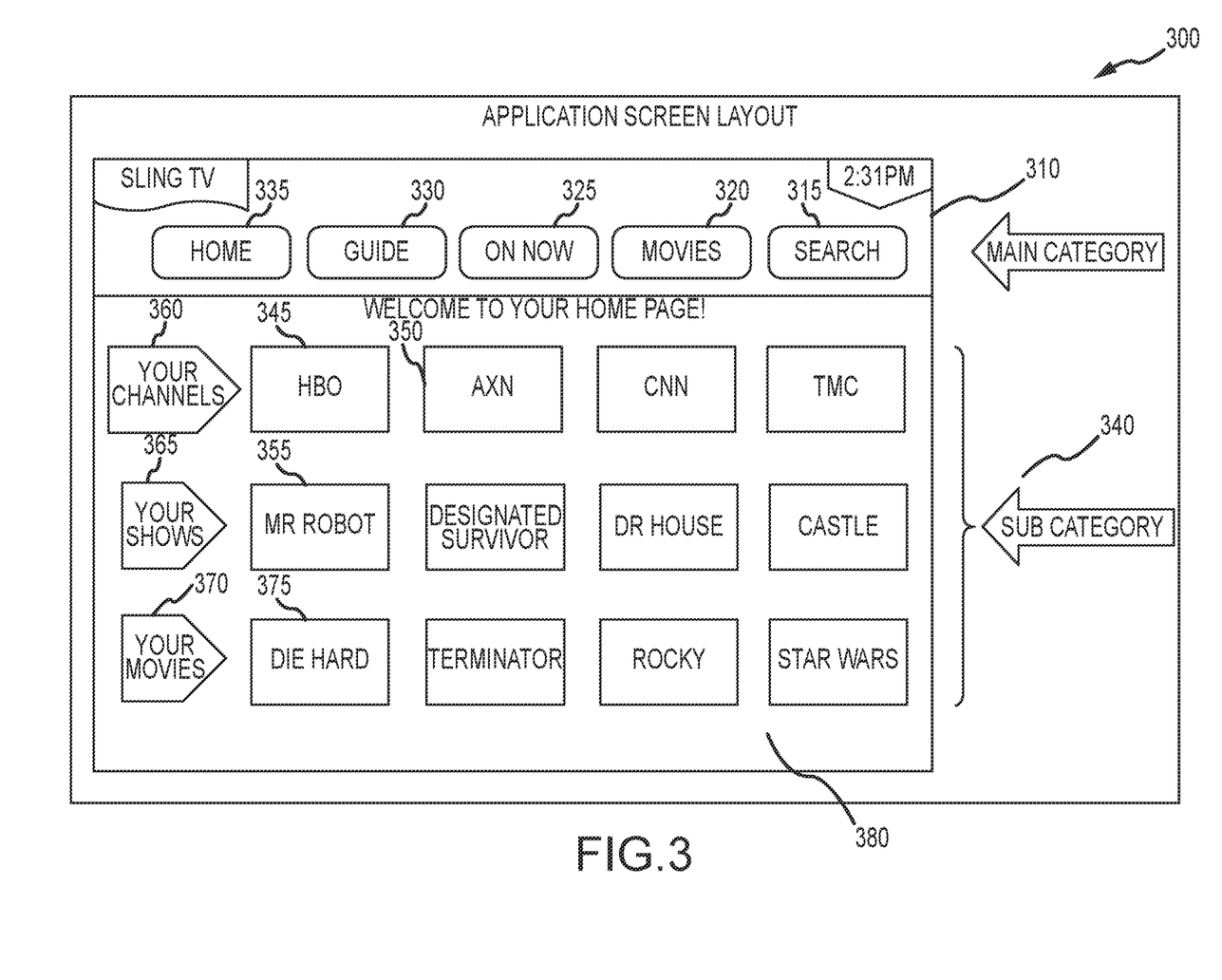
FIG. 3 is an exemplary diagram of the application screen layout for use with the remote control device in accordance with an embodiment.

FIG. 3 in an exemplary embodiment of an application screen layout 300 for the SLING® TV™. The application screen layout 300 includes various categories 310 with the labels home 335, guide 330, On now 325, moves 320, and search 315 in a select area of categories 310. In another area of subcategory 340, the application screen layout 300 includes a "welcome to your home screen which includes the subcategory 340 of your channels 360, your shows 365, and your movies 370. In addition, various items are included in the subcategory 340, for example, an item labeled HBO 345 for your channels 360, an item labeled Mr. Robot 355 for your shows 365 and an item labeled Die Hard 375 for your movies 370.

In various embodiments, a user would be able to use the circular button 20 (in FIG. 2) for enhanced navigating such as scrolling through a series of categories, subcategories in the user interface for selecting a desired streaming media content in the application screen layout 300 in a navigation mode. In an exemplary embodiment, by rotating the circular button 20 functionality is presented to the user that includes hopping or moving past multiple sets of categories 310 and then selecting a feature 380. In an embodiment, feature 380 may also be selected using the up/down/right/left tabs that are configured on the circular button 20. In embodiments, the user while navigating the subcategory 340, switches categories 310 without having to navigate up to the categories 310 section using the circular button 20 to scroll, move up and down, and select. Hence, the circular button 20 enhances the ability of the user to quickly navigate the items in the on the application screen layout 300 by allowing the user to quickly cycle or scroll through various categories 310 with a minimum number of button type actuation of button strokes. In addition, the user can quickly search 315, select a guide 330, go home 335 and revert back if desired using touch actuation with the circular button 20 and its tabs.

In an exemplary embodiment, like navigating the application screen layout 300, the user can navigate an EPG using the circular button 20 by rotating the dial to scroll up and down showtimes, programs, and channels as presented in various EPG configurations.

Figure 4:
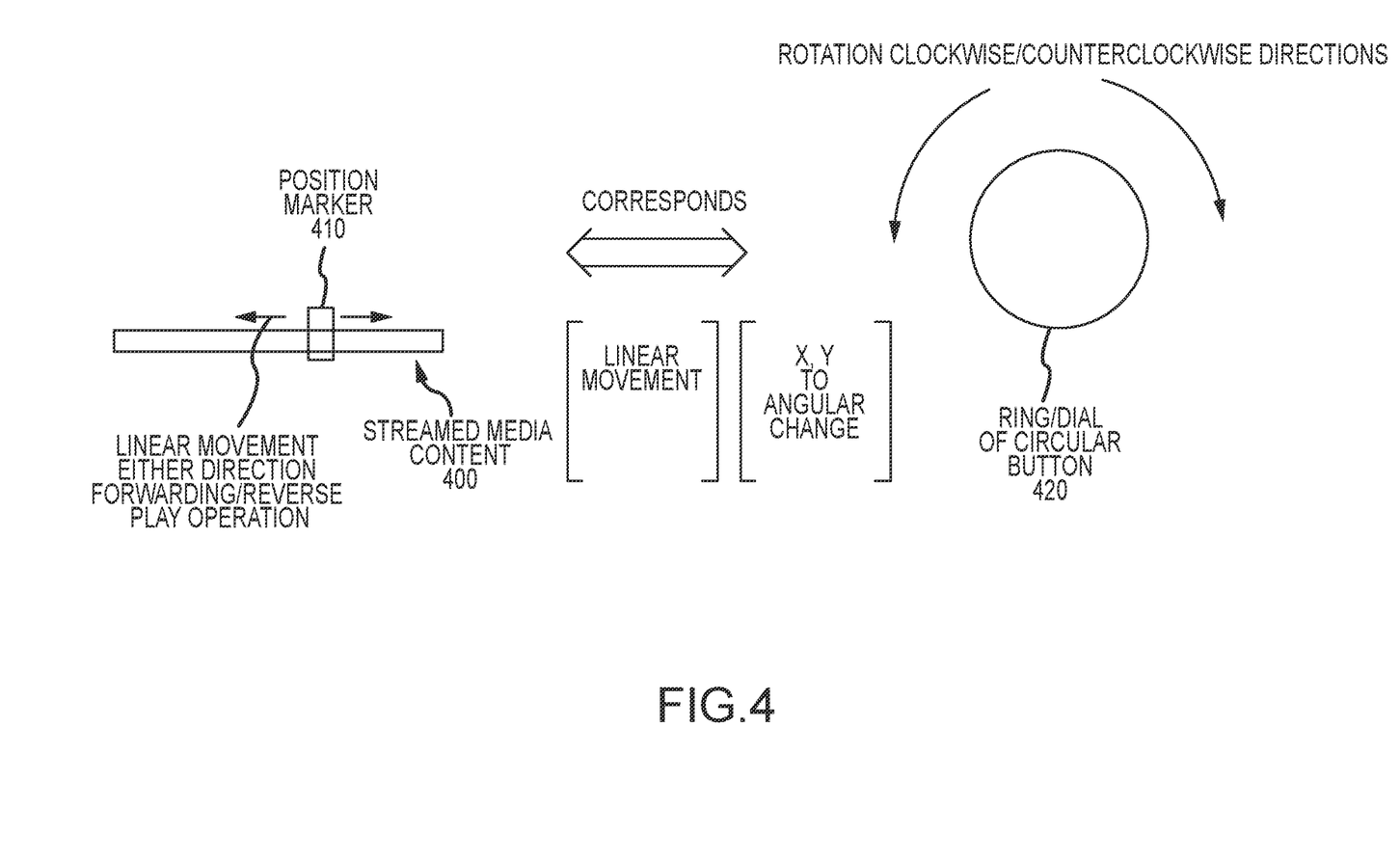
FIG. 4 is an exemplary diagram depicting rotation of a circular button and linear change in a marker of played media content by a media player device that is connected to the remote control device in accordance with an embodiment.

FIG. 4 shows an exemplary position that is responsive to changes in the direction by rotation of the circular button in accordance with an embodiment. In FIG. 4 there is shown a bar 400 that may be a timeline of streamed media content recorded and a position marker 410 that changes in position in accordance with the rotation in either clockwise or counterclockwise direction of the ring 420 of the circular button 20. The linear or horizontal amount (or magnitude) of the change in position of marker 410 is represented by an amount of rotation of the ring 420 of the circular button 20 in either direction.

Figure 5:
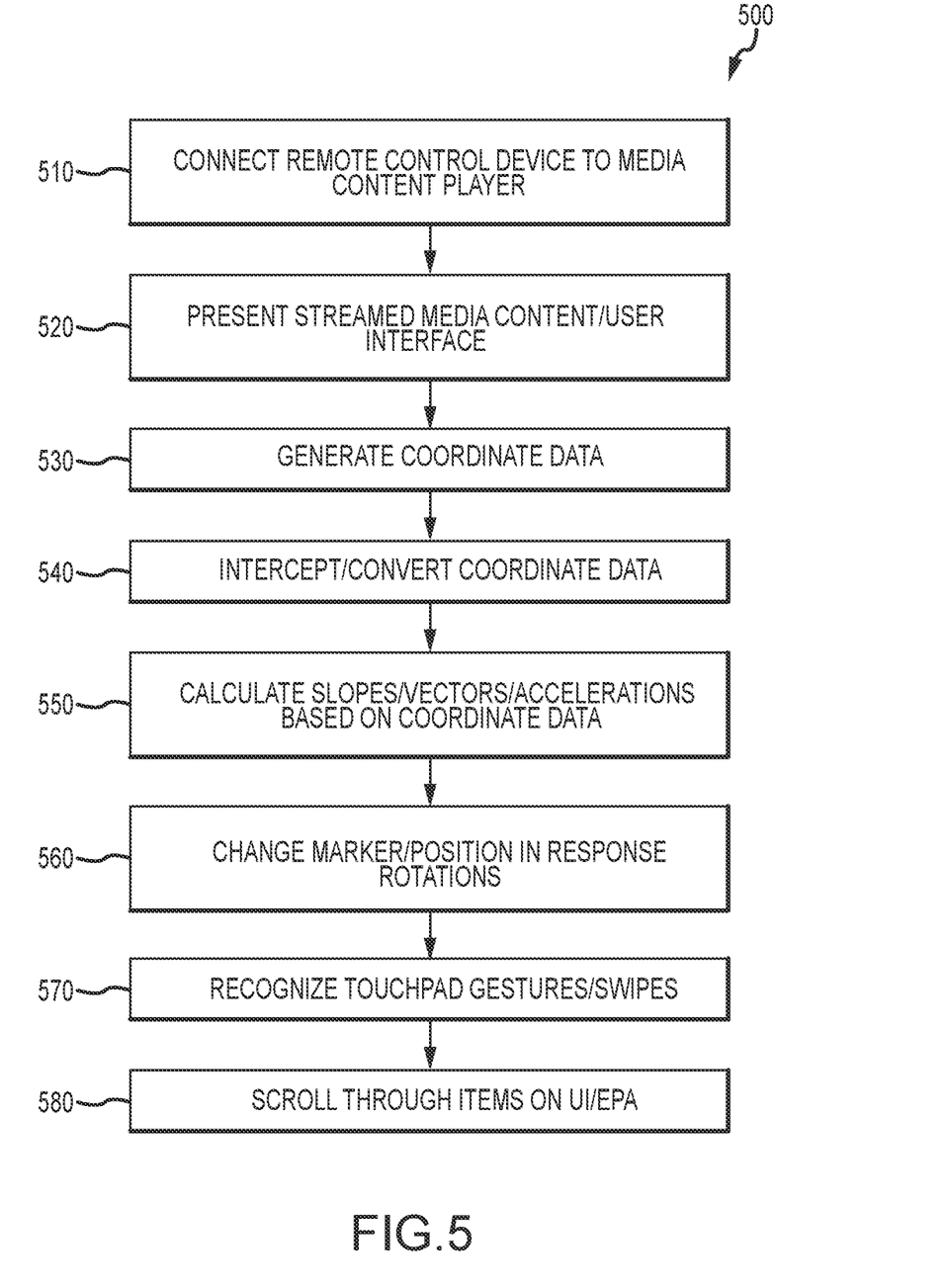
FIG. 5 is a flowchart of the task associated with operating circular button of the remote control device in accordance with an embodiment.

FIG. 5 is a flowchart 500 illustrating an exemplary process for implementing an embodiment of the present disclosure. At task 510 of FIG. 5, the remote control device is connected to a media player device of enabling the remote control device to actuate various commands to the media player device. At task 520, an application screen layout or EPG is displayed with items for navigating for the user to scroll through and select, etc. to stream media content. In embodiments, the user may already have selected the streamed media content, and the media content is currently being played (i.e., presented) and viewed by the user. At task 530, the user generates coordinate data by rotating in either a clockwise or counterclockwise direction the circular button (i.e., the button's physical ring).

At task 540, the coordinate data is intercepted by a processor disposed in or coupled to the remote control device using a script or application in memory of the remote control device or accessible at a receiver or downloadable at a cloud location, to convert the coordinate data to a linear data amount or other types of quantity metric. At task 550, converting by a processor using a script or program, data about rotational motion that includes the manner (i.e., acceleration) of rotating a dial of the circular button and start and stop positions by calculations of various slopes between points (i.e., positional data generated) and accelerations of rotations of the dial when rotated by a user derived from positional data in a cartesian plane. That is the rotating circular button is ordinarily configured to generate only coordinate data. The cartesian coordinate information is converted or translated to linear data to determine a linear data amount (horizontal change) in a horizontal positional bar or timeline of a currently positioned marker to a new marker position that corresponds to the rotation of the circular button. At task 560, the media player is caused a change from a current position of played media content to a new position by a forward play operation or a reverse play operation that is responsive to the clockwise or counterclockwise movement of the circular button. In embodiments, dependent on the acceleration and movement in rotation of the circular button, the change by the forward play operation or reverse play operation can be instituted in a range from a slow to fast forward and reverse play operation.

At task 570, in exemplary embodiments, instead of using a circular button, the remote control device may be configured with a touchpad, or a virtual keypad with a touchpad or circular dial may also be configured. In embodiments, for the touchpad, touch gestures and swipes are converted similarly to amounts of rotations from cartesian coordinate data generated. In a like manner, a range of control operations of the current position of a played media content is changed to a new position that is responsive to the slope and positional calculations derived in a linear plane of horizontal movements corresponding to manner and type of gesture or swipe for scrolling and repositioning a play operation of media content played by a media player device.

In exemplary embodiments, at task 580, rotation of the circular button, or gestures/swipes on a touchpad are converted to linear displacement actions for scrolling through a series of items on a user interface or EPG based on slopes and accelerations from the positional cartesian data that is related to the manner and type of the gesture, swipe or shaped rotation, etc. performed by the user by touch on the touchpad. Also, the touch actions by the user of for example rotational movement (dependent on the hardware configuration of the remote control device) can be enabled for detection anywhere on the touchpad of the remote control device.

Figure 6:
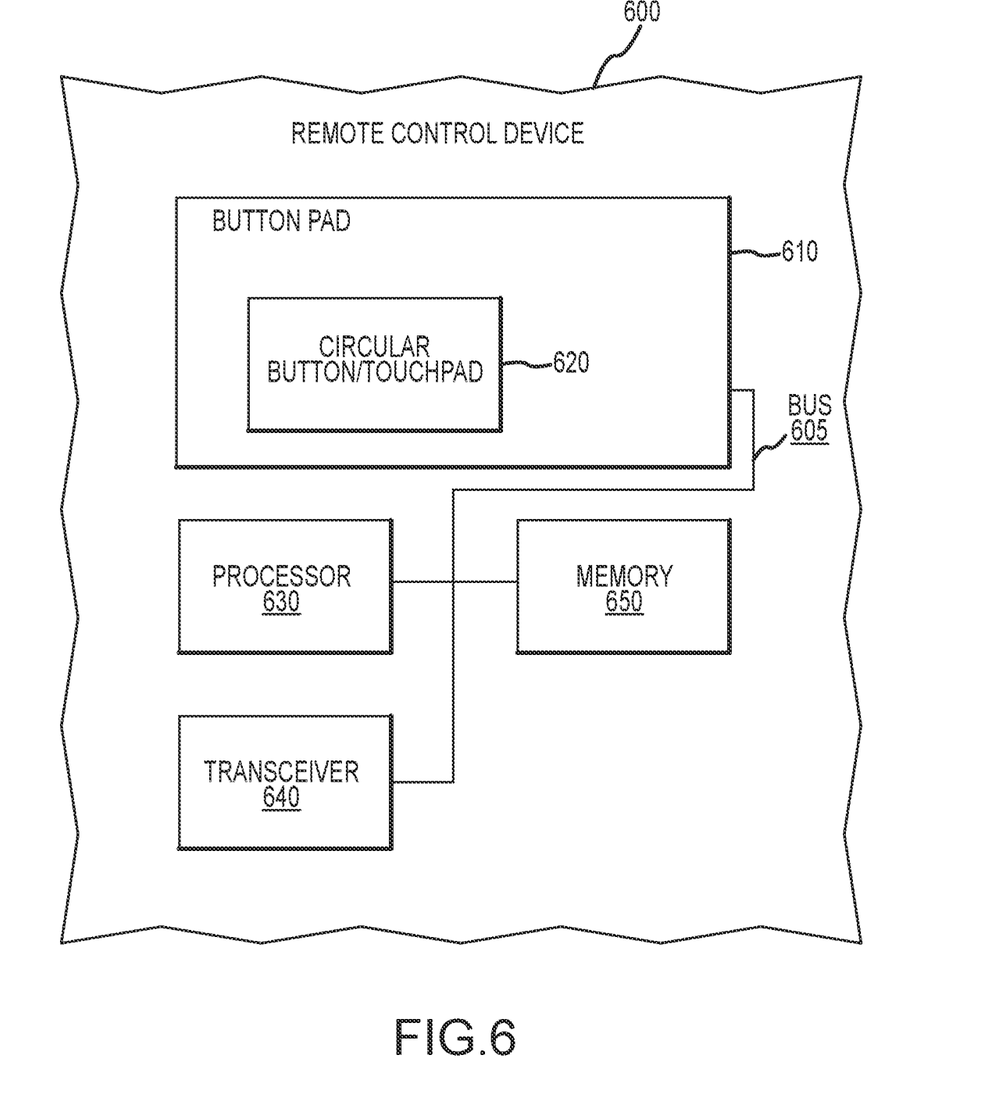
FIG. 6 is a diagram of the components of the remote control device in accordance with an embodiment.

FIG. 6 is a remote control device 600 in accordance with an exemplary embodiment. The remote control device 600 of FIG. 6 includes a bus 605 coupling various components of the remote control device 600. The components of the remote control device 600 include a navigation button pad 610 coupled to the bus 605, a circular button or touchpad 620 (for enabling the multi-functional streaming and navigation control operations) 620 coupled to the bus 605, a processor 630 coupled to the bus 605, a transceiver 640 coupled to the bus 605, and a memory 6500 coupled to the bus 605. FIG. 6. is not limited to the particular components illustrated and various embodiments may include additional components included for various added functionalities including a power supply, LED indicators, power button, etc. In various embodiments, the processor 630 by software application solutions (or scripts) determines signals received from user actuation from the circular button or touchpad 620 of cartesian coordinate data for converting, transforming, and generating commands and operations related to navigating media content that is being presented or played and selecting items on an on-screen application. In another mode, the processor 630 by software application solutions (or scripts) determines signals received from user rotation of the circular button or gestures on the touchpad 620 for generating commands and operations related to streaming of media content from the media player device (not shown).

In embodiments, the processor 630 is configured with a filtering application to perform smoothing operations on the raw data generated by the touch operations from the user actuation of the circular button or touchpad 620 (e.g., choppy or erratic manual operations by the user can cause fluctuations in the cartesian coordinate data used to generate commands for navigating the media content).

In embodiments, the processor 630 implements algorithms for calculations of rotational motion using both linear and non-linear transform functions. In the case of large variations of user movement, a non-linear function is used to transform the large variation of movements detected (i.e., normalize to a linear scale) to the linear scale of the media timeline (i.e., on-screen streamed video timeline or like). In addition, the calculations of rotational motion when the user makes small type movements are based on a linear transformation function. That is, the linear transform function based calculations are better suited and/or required to account for slower and finer adjustments to the circular button and like swipes or gestures by the user, and for incremental movements or control operations along the media timeline (while a non-linear transform function is used for calculations of fast user motions). The linear transform function-based calculations also enable media control operations such as a quick scan of media content displayed in short or long videos or recorded streamed content. For example, user very fast and longer type movements of the circular button and like swipes or gestures are enabled by using linear based functions in calculations of control operations that allow the user to navigate (i.e., move) the entire length of a video (or another type of recorded streamed content) whether the video displayed is short or long.

In addition, a software application (or scripts) executed by processor 630 may be locally stored in memory 650. Also, updates and new instructional sets for the software applications (or scripts) executed by the processor 630 may be downloaded via the transceiver 640 coupled to the processor 630 via the bus 605 and to the media player device. In some instances, a remote control device 600 not containing the software applications for the multi-function streaming control operations of the circular button or touchpad may be downloaded automatically or at the user's discretion. For example, in legacy devices, the application software may be downloaded for execution by processor 630 to provide the enhanced circular button operations.

Various exemplary embodiments allow the circular button or circular gestures of a touchpad to be programmed to enable control play operations of streamed content of apps such as the NETFLIX®, YOUTUBE®, GOGGLE® play, AMAZON® Prime, APPLE® TV, without the need for separate buttons on the remote control device. It is contemplated that any variety of control operations and shortcuts may be programmed into the circular type translated motions of a circular button when viewing streamed content on a media player via directly connecting to apps desired by the user.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. An apparatus to control a display of media content, the apparatus comprising:
    a media player device;
    a remote control device in wireless communication with the media player device;
    a keypad disposed on the remote control device and including a plurality of buttons for controlling the media player device; and
    a circular button of the plurality of buttons configured to generate movement data in response to a rotational motion,
        wherein the media player device intercepts the movement data and performs an adjustable operation on a playback position of streamed media content in response to the rotational motion of the circular button,
        wherein the media player device translates an angular displacement and a velocity of the circular button during the rotational motion to a magnitude of change applied to the playback position by the adjustable operation.

2. The apparatus of claim 1, wherein the rotational motion of the circular button is converted via a script by applying a linear function.

3. The apparatus of claim 2, wherein the rotational motion of the circular button is converted by the script based on a slope calculation that determines the velocity of the circular button.

4. The apparatus of claim 3, wherein the rotational motion of the circular button is converted to the magnitude of change applied to the playback position in accordance with a calculated amount of the rotational motion.

5. The apparatus of claim 4, wherein the rotational motion of the circular button is converted to the magnitude of change by applying the linear function to the rotational motion.

6. The apparatus of claim 1, wherein the circular button comprises a touchpad that detects the rotational motion.

7. The apparatus of claim 6, wherein the touchpad detects the rotational motion in response to a gesture or swipe.

8. A method of controlling display of media content, comprising:
    configuring a remote control device including a button pad with a plurality of buttons for controlling a media player device,
        wherein the plurality of buttons includes a circular button,
        wherein the remote control device generates coordinate data in response to a rotational movement detected by the circular button,
        wherein the rotational movement comprises an angular displacement and a velocity;
    intercepting, by a processor in communication with the remote control device, the coordinate data generated in response to the rotational movement of the circular button;
    converting, by the processor, the coordinate data to a linear amount of position change based on the angular displacement and the velocity of the circular button; and
    changing a playback position of streamed media content playing on the media player device by applying the linear amount of position change.

9. The method of claim 8, wherein the linear amount is based on a linear function applied to the rotational movement.

10. The method of claim 9, further comprising:
    converting, by the processor, the rotational movement of the circular button by a script based on slope calculation that determines the velocity, wherein the velocity is derived from differences in slope based on positional data in a cartesian plane generated in response to the rotational movement of the circular button.

11. The method of claim 10, wherein the circular button of the remote control device comprises a touchpad, wherein the rotational movement is detected in response to gestures or swipes on the touchpad.

12. The method of claim 8, further comprising detecting the rotational movement on a touchpad, wherein the circular button comprises the touchpad.

13. The method of claim 8, further comprising:
    converting the rotational movement of the circular button using a script based on a slope calculation that determines the velocity, wherein the velocity is derived from differences in slope based on positional data in a cartesian plane generated in response to the rotational movement of the circular button.

14. The method of claim 12, further comprising:
    converting the rotational movement of gestures or swipes on the touchpad by a script based on a slope calculation that determines the velocity, wherein the velocity is derived from differences in slope based on positional data in a cartesian plane generated in response to the rotational movement on the touchpad.

15. A video presentation system comprising:
    a receiver to receive data associated with streaming media content;
    a display operatively coupled to the receiver for presenting the streaming media content; and
    a remote control operatively coupled to the receiver, the remote control including a circular button that performs actions associated with controlling a playback of the streaming media content, wherein a rotational movement of the circular button comprises an angular displacement and a velocity, wherein coordinate data generated in response to the rotational movement of the circular button is intercepted and converted to linear data based on the angular displacement and the velocity of the circular button, wherein the receiver uses the linear data to adjust a position of the playback by a magnitude corresponding to the angular displacement and the velocity.

16. The system of claim 15, wherein the circular button is ordinarily designated for cursor positioning on the display and is reconfigured to control the playback of the streaming media content.

17. The system of claim 16, wherein the circular button is ordinarily designated for cursor positioning on the display and is reconfigured for use to navigate a user interface that comprises items for selection.

18. The system of claim 17, wherein the rotational movement of the circular button is converted by a script based on a slope calculation that determines the velocity, wherein the velocity is derived from differences in slope based on positional data in a cartesian plane that is generated in response to the rotational movement of the circular button.

19. The system of claim 18, wherein the circular button comprises a touchpad, and wherein the rotational movement is detected in response to gestures or swipes on the touchpad.

20. The system of claim 19, wherein the rotational movement is detected on the touchpad of the remote control, and wherein the rotational movement comprises a gesture or swipe.

* * * * *